United States Patent
Hassan et al.

(10) Patent No.: US 12,505,682 B2
(45) Date of Patent: Dec. 23, 2025

(54) CLOSE FOLLOWING DETECTION USING MACHINE LEARNING MODELS

(71) Applicant: MOTIVE TECHNOLOGIES, INC., San Francisco, CA (US)

(72) Inventors: Ali Hassan, Lahore (PK); Afsheen Rafaqat Ali, Gujranwala (PK); Hussam Ullah Khan, Lahore (PK); Ijaz Akhter, Lahore (PK)

(73) Assignee: MOTIVE TECHNOLOGIES, INC., San Francisco, CA (US)

( * ) Notice: Subject to any disclaimer, the term of this patent is extended or adjusted under 35 U.S.C. 154(b) by 547 days.

(21) Appl. No.: 17/468,799

(22) Filed: Sep. 8, 2021

(65) Prior Publication Data

US 2023/0077207 A1 Mar. 9, 2023

(51) Int. Cl.

| | |
|---|---|
| *G06V 20/56* | (2022.01) |
| *B60R 1/12* | (2006.01) |
| *B60R 1/24* | (2022.01) |
| *G06F 18/2431* | (2023.01) |
| *G06N 3/08* | (2023.01) |
| *G06T 11/20* | (2006.01) |

(52) U.S. Cl.
CPC ............. *G06V 20/588* (2022.01); *B60R 1/24* (2022.01); *G06F 18/2431* (2023.01); *G06N 3/08* (2013.01); *G06T 11/20* (2013.01); *B60R 2001/1253* (2013.01); *G06T 2210/12* (2013.01)

(58) Field of Classification Search
CPC ..... G06V 20/588; G06F 18/2431; B60R 1/00; B60R 2001/1253; G06N 3/08; G06T 11/20; G06T 2210/12
See application file for complete search history.

(56) References Cited

U.S. PATENT DOCUMENTS

| | | | |
|---|---|---|---|
| 10,984,290 | B1 | 4/2021 | Goel et al. |
| 11,069,082 | B1 * | 7/2021 | Ebrahimi Afrouzi .. H04N 23/56 |

(Continued)

FOREIGN PATENT DOCUMENTS

| | | | | |
|---|---|---|---|---|
| CN | 107909016 | A * | 4/2018 | ............... G06N 3/08 |
| CN | 110345924 | A * | 4/2018 | ............. G01C 11/04 |

(Continued)

OTHER PUBLICATIONS

International Search Report and Written Opinion to corresponding International Search Report PCT/US2022/076007 mailed Nov. 22, 2022 (13 pages).

(Continued)

*Primary Examiner* — Qun Shen
(74) *Attorney, Agent, or Firm* — George Zalepa; Greenberg Traurig, LLP

(57) ABSTRACT

Described are embodiments for training and using a close following classifier. In the example embodiments, a system includes a backbone network configured to receive an image; and at least one prediction head communicatively coupled to the backbone network, the at least one prediction head configured to receive an output from the backbone network, wherein the at least one prediction head includes a classifier configured to classify the image as including a close-following event, the classifier receiving the output of the backbone network and a vehicle speed as inputs.

20 Claims, 10 Drawing Sheets

(56) References Cited

U.S. PATENT DOCUMENTS

| | | | |
|---|---|---|---|
| 11,637,998 B1* | 4/2023 | Pieper | H04N 9/7973 |
| | | | 348/207.99 |
| 2019/0266418 A1* | 8/2019 | Xu | G06V 10/764 |
| 2019/0384304 A1* | 12/2019 | Towal | G05D 1/0221 |
| 2020/0209864 A1* | 7/2020 | Chen | G01C 21/3811 |
| 2021/0031772 A1 | 2/2021 | Gomora | |
| 2021/0042575 A1* | 2/2021 | Firner | G05D 1/0088 |
| 2021/0056306 A1* | 2/2021 | Hu | G06V 10/764 |
| 2021/0086364 A1* | 3/2021 | Handa | G06V 20/56 |
| 2021/0142160 A1* | 5/2021 | Mohseni | G06F 18/24 |
| 2021/0191395 A1 | 6/2021 | Gao et al. | |
| 2021/0271259 A1* | 9/2021 | Karpathy | G06N 3/045 |
| 2021/0350150 A1* | 11/2021 | An | G06F 18/214 |
| 2021/0383533 A1* | 12/2021 | Zhao | G06V 20/64 |

FOREIGN PATENT DOCUMENTS

| | | | |
|---|---|---|---|
| WO | 2021046578 A1 | 3/2021 | |
| WO | 2021092702 A1 | 5/2021 | |

OTHER PUBLICATIONS

Extended EP Search Report issued in corresponding EP Appln. No. 22868250.6, mailed Apr. 7, 2025, 9 pages.

Ishihara et al., "Multi-task Learning with Attention for End-to-end Autonomous Driving," Arxic. Org., Cornell University Library, (2021).

Wenyuan et al., "DSDNet" Deep Structured Self-driving Network, pp. 156-172 (2020).

* cited by examiner

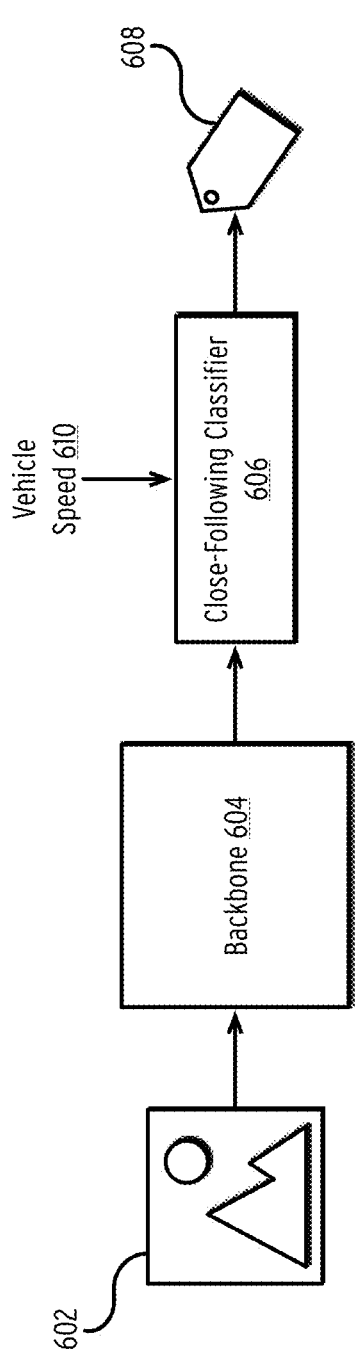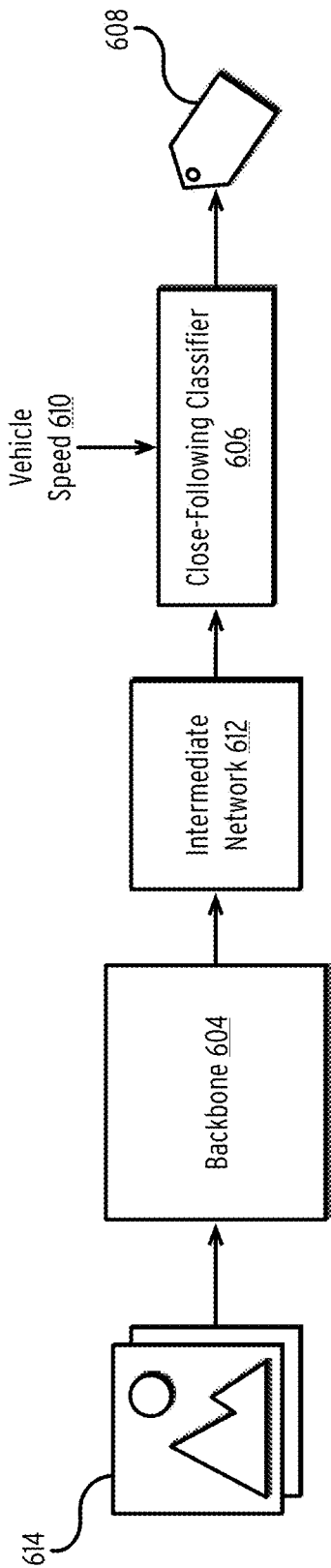

CLOSE FOLLOWING DETECTION USING MACHINE LEARNING MODELS

BACKGROUND

Drivers are required to maintain a certain safe distance from the front vehicle ahead of the driver's vehicle, depending upon their vehicle's speed and size (e.g., weight). A typical three-second rule for lightweight vehicles means that the driver needs to maintain a long enough distance from the front vehicle such that if the front vehicle must pull an emergency break, they will have enough time (e.g., three seconds) to stop and avoid the crash with the front vehicle. For heavy vehicles, the time-to-hit threshold is even larger (e.g., 5-10 seconds or more) as stopping a heavy vehicle requires more time and space. The act of not maintaining a safe distance from the front vehicle is called close following. One of the main concerns in the industry is identifying if the drivers are close following the leading vehicle or not, even if they avoid crashes. Identification of close following helps prevent crashes which are costly in terms of human lives and monetary damages.

BRIEF SUMMARY

The example embodiments describe a close following classifier and techniques for training the same. The example embodiments include training the classifier using a multi-task model which exploits features across a plurality of prediction heads using a joint loss function aggregating the individual losses of the prediction heads. The trained classifier can then be deployed on edge devices to perform close following classification based solely on image data and vehicle speed.

In an embodiment, the system includes a backbone network configured to receive an image. The system further includes at least one prediction head communicatively coupled to the backbone network, each of the at least one prediction head configured to receive an output from the backbone network, wherein at least one prediction head includes a classifier configured to classify the image as including a close-following event, the classifier receiving the backbone's output and a vehicle speed as inputs.

In an embodiment, the at least one prediction head can include a close following classification head, a camera obstruction detection head, a lane detection head, an object detection head, and a distance estimation head. In an embodiment, the close following classifier is configured to receive inputs from the lane detection head, object detection head and the distance estimation head. In an embodiment, the distance estimation head is configured to receive an input from the object detection head. In an embodiment, the at least one prediction head further comprises a convolutional network, the convolutional network configured to convolve the output of the backbone network and feed the output to the classifier. In an embodiment, the system further comprises a convolutional network configured to convolve the output of the backbone network and feed the output to each of the prediction heads. In an embodiment, the plurality of prediction heads comprises a camera obstruction detection head, a lane detection head, and an object bounding box, lane number and distance estimation head. In an embodiment, the classifier is configured to receive inputs from the lane detection head and the object bounding box, lane number and distance estimation head. In an embodiment, the object bounding box, lane number and distance estimation head is configured to receive an input from the lane detection head.

In another set of embodiments, a system includes a backbone network configured to receive an image. The system further includes a classifier configured to classify the image as including a close-following event, the classifier receiving the output of the backbone network as an input, the classifier trained using a neural network, the neural network comprising a plurality of prediction heads including the classifier, the plurality of prediction heads communicatively coupled to the backbone network and trained using a joint loss function aggregating losses of each of the plurality of prediction heads.

In an embodiment, the system further comprises a convolutional network communicatively coupled to the backbone network and the classifier, the convolutional network configured to convolve the output of the backbone network prior to transmitting the output to the classifier. In an embodiment, the backbone network is configured to receive a video frame from a camera. In an embodiment, the camera comprises a camera situated in a dash-mounted device. In an embodiment, the backbone network and the classifier are executed on the dash-mounted device.

In another set of embodiments, a method and non-transitory computer-readable storage medium for tangibly storing computer program instructions capable of being executed by a computer processor for executing the method are disclosed. In an embodiment, the method includes receiving an image; processing the image using a backbone network, the output of the backbone network comprising a set of features; inputting the set of features to at least one prediction head, wherein the plurality of prediction heads generates a prediction vector, and wherein the at least one prediction head includes a classifier configured to classify the image as including a close-following event or not; and adjusting parameters of the backbone network and at least one prediction head using a loss function.

In an embodiment, the at least one prediction head includes a camera obstruction detection head, a lane detection head, an object detection head, and distance estimation head. In an embodiment, the plurality of prediction heads further comprises a convolutional network, the convolutional network configured to convolve the output of the backbone network and transmit the output to the classifier. In an embodiment, the method further comprises convolving, using a convolutional network, the output of the backbone network, and transmitting the output to each of the plurality of prediction heads. In an embodiment, the at least one prediction head comprises a camera obstruction detection head, a lane detection head, and an object bounding box, lane number and distance estimation head. In an embodiment, the joint loss function comprises an aggregate of individual loss functions, each of the individual loss functions associated with a corresponding prediction head in the plurality of prediction heads.

BRIEF DESCRIPTION OF THE DRAWINGS

FIG. 6A is a block diagram illustrating an ML model for predicting close following according to some embodiments.

FIG. 6B is a block diagram illustrating an ML model for predicting close following according to some embodiments.

DETAILED DESCRIPTION

Figure 1:
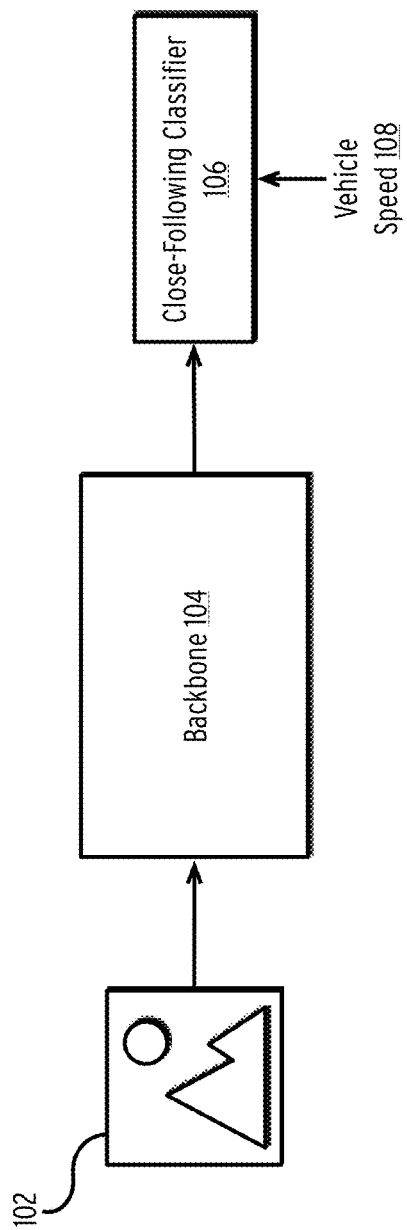
FIG. 1 is a block diagram illustrating a system for training a machine learning (ML) model for predicting close following according to some embodiments.

FIG. 1 is a block diagram illustrating a system for training a machine learning (ML) model for predicting close following according to some embodiments.

In the system of FIG. 1, an ML system includes a backbone network 104 and a close-following classifier 106.

In the example embodiments, the system is trained using one or more labeled examples, such as training image 102. In an embodiment, training image 102 comprises an image such as a video frame and a plurality of ground truths. In an embodiment, the ground truths correspond to the output of the close-following classifier 106. For example, the training image 102 can include a ground truth value corresponding to the predicted output of the close-following classifier 106.

Further, in an embodiment, each training image 102 is also associated with vehicle speed 108 (or, in some embodiments, a velocity). In an embodiment, a set of examples (e.g., training image 102) and corresponding ground truth data are referred to as training data. In some embodiments, training data can be obtained from one or more dash-mounted or windshield-mounted cameras installed in vehicles. For example, a fleet of tractor-trailers can be equipped with dash-mounted or windshield-mounted cameras that record video files that are segmented into individual image frames and used as training data. In such an embodiment, the dash-mounted cameras can be further configured to record speed data and synchronize this speed data with the video files.

In some embodiments, each image can be represented as a tensor of three dimensions, with shape represented as a tuple of the image height, width, and depth. For example, a 128×128 RGB image has a height and width of 128 pixels and a depth of three for each color (red, green, blue). Similarly, a 1024×1024 grayscale image has a height and width of 1024 pixels with a depth of one (black). Generally, the network is trained in the form of batches of images, and the number of images inside a batch is called batch size. Thus, in some embodiments, the input shape into the backbone network 104 can be represented as (b, h, w, d), where b represents the batch size, h and w represent the height and width of each image, and d represents the color depth of each image. In some embodiments, the batch size can be used as the size of the training data.

The backbone network 104 receives training data such as training image 102 and generates a feature vector representation of the training image 102 after one or more convolution (or other) operations. In one embodiment, backbone network 104 comprises a deep neural network. In some embodiments, backbone network 104 comprises a convolutional neural network (CNN). In an embodiment, backbone network 104 comprises a scalable CNN, scaled using a compound coefficient. In some embodiments, backbone network 104 can comprise any CNN wherein the CNN is scaled by uniformly scaling the depth of the network (i.e., the number of layers), the width of each layer, and the resolution (e.g., image height and width) of the input images. In one embodiment, backbone network 104 comprises an EfficientNet model. In one embodiment, backbone network 104 comprises an EfficientNet-B0 network or EfficientNet-lite0 network. In an embodiment, a lightweight network (e.g., EfficientNet-lite0) can be used to support edge prediction, while a heavier model (e.g., EfficientNet-B0) can be used if the model is running on a centralized computing device. Although the foregoing description emphasizes the use of CNNs scaled with uniform compound coefficients (e.g., EfficientNet variants), other networks can be used. For example, the backbone network 104 can comprise a ResNet, VGG16, DenseNet, Inception, Xception, PolyNet, SESNet, NASNet, AmoebaNet, PNASNet, GPipe, MobileNet (v1 to v3), transformer network, or another similar image classification deep neural network.

In another embodiment, the backbone network 104 can output a feature vector (e.g., generated by a CNN) to a feature pyramid network (FPN). In some embodiments, the FPN comprises a bidirectional FPN (BiFPN). In this alternative embodiment, the FPN can receive a plurality of detected features from a CNN and repeatedly applies top-down and bottom-up bidirectional feature fusion. The fused features generated by FPN can then be supplied to one or more downstream prediction heads communicatively coupled to the backbone network 104. For example, the FPN can detect various objects of interest at different resolutions of the given image. As illustrated, the use of an FPN may be optional.

In the illustrated embodiment, the system includes a close-following classifier 106. In one embodiment, close-following classifier 106 can comprise a binary classifier. In such an embodiment, close-following classifier 106 classifies one or more inputs into representing a close-following event or not. In one embodiment, the close-following classifier 106 receives the feature vector from backbone network 104 and (optionally) a vehicle speed 108. Thus, the input to close-following classifier 106 can be shaped as:

$$[\text{image}_{features}, \text{speed}] \quad \text{Equation 1}$$

In Equation 1, $\text{image}_{features}$ comprises the numerical features output by backbone network 104 and speed comprises a floating-point value of the speed of the vehicle equipped with a camera that captured training image 102 at the time of capture (e.g., vehicle speed 108).

Using these inputs, the close-following classifier 106 can determine whether the vehicle (including the camera that captured training image 102) is engaging in close-following with another object (e.g., vehicle). In some embodiments, the close-following classifier 106 can be implemented as a decision tree, random forest, SVM, logistic regression model, or neural network. In some embodiments, a CNN can be used to implement a close-following classifier 106. Details of training the system are provided in the description of FIG. 7B.

Figure 2:
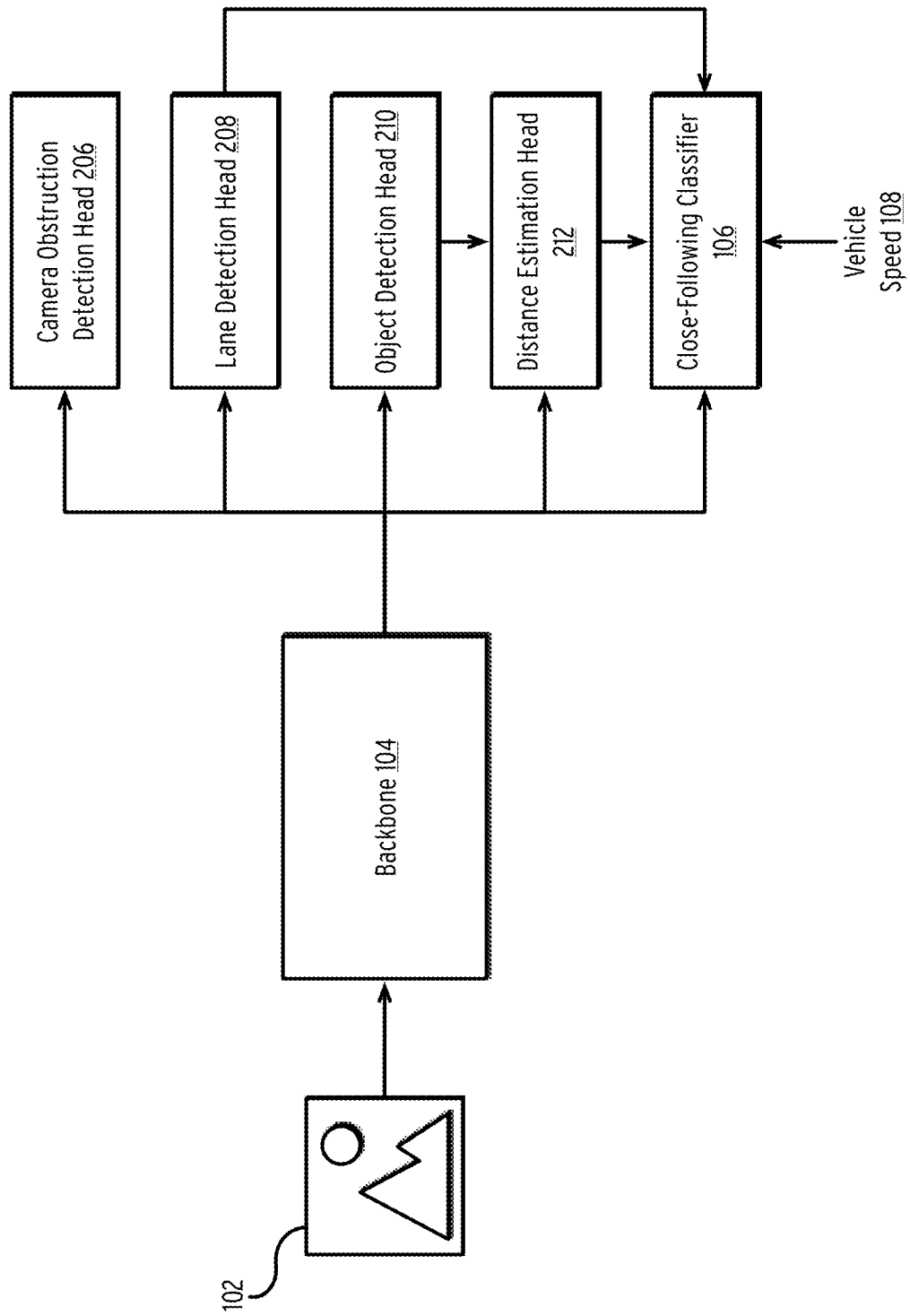
FIG. 2 is a block diagram illustrating a system for training an ML model for predicting close following according to some embodiments.

FIG. 2 is a block diagram illustrating a system for training a machine learning (ML) model for predicting close following according to some embodiments.

In the system of FIG. 2, an ML system includes a backbone network 104 and a plurality of prediction heads communicatively coupled to the backbone network 104, including a camera obstruction detection head 206, a lane detection head 208, an object detection head 210, a distance estimation head 212, and a close-following classifier 106. As illustrated, each of the prediction heads receives, as at least a first input, the output of the backbone network 104. As illustrated, some prediction heads can receive additional inputs. Further, some prediction heads can share their outputs as inputs to other prediction heads. For example, distance estimation head 212 receives the output of the object detection head 210 as an input. As another example, close-following classifier 106 receives the output of the distance estimation head 212, the output of the lane detection head 208, and a vehicle speed 108 as inputs. In some embodiments, the inputs can be combined to form a single input vector or tensor. As will be discussed, each of the prediction heads generates a prediction for a given input. The format of the prediction can vary depending on the type of head. During training, these outputs are then compared to a ground truth value, and a loss for each head is computed. A joint loss is then computed across all prediction heads, and the system back-propagates derivatives of the joint loss throughout the network to adjust the weights and biases of all neurons in the backbone network 104 and individual prediction heads. In some embodiments, the joint loss comprises a function aggregating the individual losses of the prediction heads.

In the example embodiments, the system is trained using one or more labeled examples, such as training image 102. Details of training images, such as training image 102, were discussed previously and are not repeated herein. However, in the embodiment of FIG. 2 (and other embodiments), a training image 102 can be associated with multiple ground truth values to enable the computation of a loss for each of the prediction heads. The form of these predicted outputs, and corresponding ground truths, are described in more detail herein.

The backbone network 104 receives training data such as training image 102 and generates a feature vector representation of the training image 102 after one or more convolution (or other) operations. Details of the backbone network 104 were provided in the description of FIG. 1 and are not repeated herein.

In the illustrated embodiment, the system includes multiple prediction heads communicatively coupled to the backbone network 104 that generate the feature vectors based on various inputs.

In the illustrated embodiment, the prediction heads communicatively coupled to the backbone network 104 include a camera obstruction detection head 206. In an embodiment, the camera obstruction detection head 206 detects if the camera that recorded training image 102 could see the road or not. In an embodiment, a camera sees a road when it is correctly situated, angled, and not occluded by external objects, thus providing a clear image of a roadway and any objects thereon. In some embodiments, the camera obstruction detection head 206 prediction operates as a gating function wherein images that are classified as not depicting the roadway are not reported to fleet managers. In an embodiment, the camera obstruction detection head 206 can be implemented as a binary classifier that classifies images such as training image 102 as either including a roadway or not including a roadway. In other embodiments, camera obstruction detection head 206 can predict a percentage of a roadway that is not obstructed and thus output a continuous prediction. In some embodiments, the camera obstruction detection head 206 can be implemented as a decision tree, random forest, support vector machine (SVM), logistic regression model, or neural network. In some embodiments, a CNN can be used to implement the camera obstruction detection head 206.

In the illustrated embodiment, the prediction heads communicatively coupled to the backbone network 104 further include a lane detection head 208. In an embodiment, the lane detection head 208 predicts a plurality of key points or lane markers that outline lane lines present on a roadway in training image 102. In some embodiments, a downstream process (not illustrated) can then fit lane lines to the key points. In an alternative embodiment, lane detection head 208 can output a set of polynomial coefficients instead of individual key points, the polynomial coefficients representing the lane lines and capable of being displayed by a downstream process. In some embodiments, the lane detection head 208 can further identify lane numbers of the detected lane-lines. In some embodiments, the lane detection head 208 can further provide a classification of whether a given lane corresponds to a lane that a vehicle that recorded training image 102 is present in (referred to as the "ego-lane"). In some embodiments, the lane detection head 208 can be implemented as a decision tree, random forest, SVM, logistic regression model, or neural network. In some embodiments, a CNN can be used to implement the lane detection head 208.

In the illustrated embodiment, the prediction heads communicatively coupled to the backbone network 104 further include an object detection head 210. In an embodiment, the object detection head 210 is configured to detect objects in training image 102 and output a bounding box surrounding the detected objects. In an embodiment, the object detection head 210 can detect multiple objects in a given image and thus outputs a set of bounding boxes. In an embodiment, the object detection head 210 can output a set of (x, y) coordinates and a height and width of the bounding box. In some embodiments, object detection head 210 can be implemented as a multi-layer regression network configured to predict the set of coordinates, height, and width for each bounding box. In some embodiments, each layer in the multi-layer regression network can comprise a convolutional layer, batch normalization layer, and activation layer, although other combinations can be used. In some embodiments, the objects detected by object detection head 210 can be limited to only vehicular objects (e.g., cars, trucks, tractor-trailers, etc.).

In the illustrated embodiment, the prediction heads communicatively coupled to the backbone network 104 further include a distance estimation head 212. In an embodiment, the distance estimation head 212 receives inputs from both the backbone network 104 and the object detection head 210. Thus, the inputs to distance estimation head 212 comprise the image feature vector and bounding boxes for detected objects. Based on these two inputs, the distance estimation head 212 can predict an estimated distance to each object identified by a bounding box. In other embodiments, the distance estimation head 212 can comprise a categorization of the distance (e.g., a bucketing of distances). For example, the distance estimation head 212 can predict whether the distance falls within three classes: 0-2 meters, 2-5 meters, or 10 or more meters. The specific amount of classes and distances are not limiting. In some embodiments, the distance estimation head 212 can output floating-point values representing the distances to each object predicted by the object detection head 210. In some embodiments, the distance estimation head 212 can be implemented via a deep recurrent convolutional neural network (RCNN), Visual Odometry (VO) and Simultaneous Localization and Mapping (SLAM), or similar types of distance estimation models. In some embodiments, a CNN can be used to implement the distance estimation head 212.

In the illustrated embodiment, the prediction heads communicatively coupled to the backbone network 104 further include a close-following classifier 106. In one embodiment, close-following classifier 106 can comprise a binary classifier. In such an embodiment, close-following classifier 106 classifies one or more inputs into representing a close-following event or not. In one embodiment, the close-following classifier 106 receives the feature vector from backbone network 104, a vehicle speed 108, and the outputs of distance estimation head 212 and lane detection head 208 as inputs. Thus, the input to close-following classifier 106 can be shaped as:

$$[\text{image}_{features}, \text{objects}, \text{speed}]. \qquad \text{Equation 2}$$

In Equation 2, $\text{image}_{features}$ comprises the numerical features output by backbone network 104, objects comprises a set of bounding boxes (i.e., coordinates, height, width), and speed comprises a floating-point value of the speed of the vehicle equipped with a camera that captured training image 102 at the time of capture.

In essence, close-following classifier 106 receives a feature vector of a given image (i.e., the input data) and additional predicted data representing which lane the vehicle (that includes the camera that captured training image 102) is located in and where other objects are located (and their distances). Using these inputs, the close-following classifier 106 can determine whether the vehicle (including the camera that captured training image 102) is engaging in close-following with another object (e.g., vehicle). In some embodiments, the outputs from distance estimation head 212 can include both a distance to an object and the bounding box associated with the same object (i.e., the output of the object detection head 210). In some embodiments, the close-following classifier 106 can be implemented as a decision tree, random forest, SVM, logistic regression model, or neural network. In some embodiments, a CNN can be used to implement a close-following classifier 106.

As illustrated, in some embodiments, various prediction heads can share their outputs with other prediction heads (e.g., the output of object detection head 210 can be used as an input to the distance estimation head 212). In other embodiments, however, each prediction head may only receive the feature from backbone network 104 as an input. In such an embodiment, close-following classifier 106 may be specially configured to also receive vehicle speed 108.

In one embodiment, the system is trained using a joint loss function aggregating the individual losses of the prediction heads. In the illustrated embodiment, each prediction head is associated with its own corresponding loss function. For example, camera obstruction detection head 206 can be associated with a camera obstruction loss function ($\text{loss}_{cam-obstruct}$) responsible for detecting if the camera is obstructed or not in the training image 102. In some embodiments, this loss could be implemented in the form of a binary cross-entropy function between the ground truth labels and the predicted labels of camera obstruction detection head 206. Lane detection head 208 can be associated with a lane detection loss ($\text{loss}_{lane}$) that evaluates the accuracy of predicted lanes with respect to ground truth data. Object detection head 210 can be associated with an object detection loss ($\text{loss}_{object}$) that evaluates the accuracy of bounding box prediction based on ground truth data. Distance estimation head 212 can be associated with a distance estimation loss ($\text{loss}_{distance}$) that evaluates the accuracy of the distances of identified objects based on ground truth data. Finally, close-following classifier 106 can be associated with a close following loss ($\text{loss}_{close-following}$) that is responsible for detecting if for the training image 102 and with the vehicle speed 108 of the corresponding vehicle, whether the vehicle is close-following or not and, thus, whether the training image 102 depicts a close-following event. The joint loss aggregating the individual losses of the prediction heads can thus be computed as:

$$\text{loss} = \text{loss}_{cam-obstruct} + \text{loss}_{lane} + \text{loss}_{object} + \text{loss}_{distance} + \text{loss}_{close-following} \qquad \text{Equation 3}$$

During training, the system can employ a backpropagation algorithm to backpropagate the partial derivatives of the joint loss aggregating the individual losses of the prediction heads through the entire network and adjust the network parameters (e.g., weights and biases) of the backbone network 104, camera obstruction detection head 206, lane detection head 208, object detection head 210, distance estimation head 212, and close-following classifier 106. In some embodiments, stochastic gradient descent (SGD) or Adam optimization can be used to perform the backpropagation.

Since a joint loss aggregating the individual losses of the prediction heads is used, the system can improve each head in the system using the predictions of other heads. In some embodiments, the system adjusts network parameters by computing the derivatives or partial derivatives of the joint loss function with respect to each network parameter. Specific details of backpropagation are not provided herein for the sake of brevity.

Figure 3:
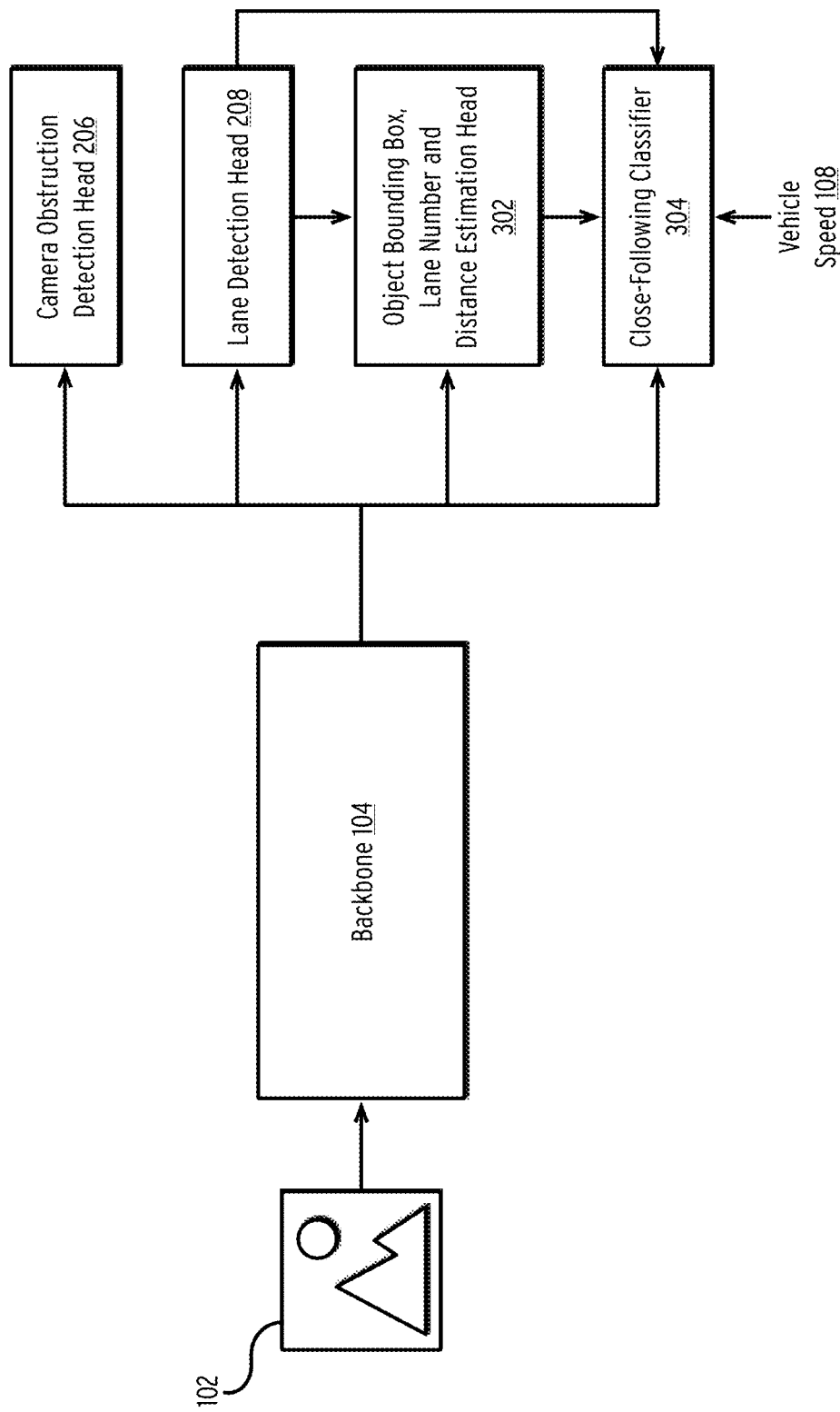
FIG. 3 is a block diagram illustrating a system for training an ML model for predicting close following according to some embodiments.

FIG. 3 is a block diagram illustrating a system for training an ML model for predicting close following according to some embodiments. In the embodiment depicted in FIG. 3, various elements bearing the same reference as those in FIG. 2 are not repeatedly described herein, and the descriptions of those elements (e.g., training image 102, backbone network 104, camera obstruction detection head 206, lane detection head 208, and vehicle speed 108) are incorporated herein in their entirety.

In contrast to the embodiments described in connection with FIG. 2, the system in FIG. 3 omits separate object detection and distance estimation heads (e.g., object detection head 210 and distance estimation head 212). In contrast, the embodiment of FIG. 3 utilizes a combined object bounding box, lane number, and distance estimation head, alternatively referred to as a combined head 302. In an embodiment, combined head 302 comprises a neural network or another predictive model that outputs a bounding box parameter (e.g., height, width, and x, y coordinates), integer lane number (e.g., 1, 2, 3, . . . ) that is associated with the object, and a floating-point distance to the object included in the bounding box. Thus, the shape of the output of 302 can be:

$$[x, y, h, w, l, n] \qquad \text{Equation 4}$$

In Equation 4, x represents the x coordinate of a bounding box surrounding an object, y represents the y coordinate of a bounding box surrounding an object, h represents the height of the bounding box, w represents the width of the bounding box, l represents a lane number integer, and n represents the distance to the object in the bounding box (represented, for example, as a floating-point distance in meters). In some embodiments, the combined head 302 can be implemented as a decision tree, random forest, SVM, logistic regression model, or neural network. In some embodiments, a CNN can be used to implement the combined head 302.

As illustrated, combined head 302 receives, as inputs, the image features from backbone network 104 as well as the lane markers or lane lines predicted by combined head 302.

In the illustrated embodiment, the close-following classifier 304 may operate similar to close-following classifier 106, and the description of close-following classifier 106 is incorporated herein in its entirety. By contrast to close-following classifier 106, close-following classifier 304 accepts the output of the combined head 302 as an input as well as the output of backbone network 104. Thus, the close-following classifier 304 receives the image features from backbone network 104, bounding box parameters for each object, a lane number associated with each object, and a distance to each object.

In the embodiment illustrated in FIG. 3, the camera obstruction detection head 206 may be associated with the same camera obstruction loss function ($loss_{cam-obstruct}$) as previously described. Similarly, the lane detection head 208 can be associated with a lane detection loss ($loss_{lane}$), and the close-following classifier 304 can be associated with a close following loss ($loss_{close-following}$), as previously discussed. In contrast to FIG. 2, the separate losses from the object detection head 210 and distance estimation head 212 are replaced with a combined loss function ($loss_{vehicle}$) which is associated with the combined head 302.

As in FIG. 2, the system is trained using a joint loss function aggregating the individual losses of the prediction heads. The joint loss aggregating the individual losses of the prediction heads can thus be computed as:

$$loss = loss_{cam-obstruct} + loss_{lane} + loss_{vehicle} + loss_{close-following}.$$

Equation 5

During training, the system can employ a back-propagation algorithm to back-propagate the partial derivatives of the joint loss aggregating the individual losses of the prediction heads through the entire network and adjust its parameters (e.g., weights and biases) of the backbone network 104, camera obstruction detection head 206, lane detection head 208 combined head 302, and close-following classifier 304. In some embodiments, SGD can be used to perform the back-propagation.

Since a joint loss aggregating the individual losses of the prediction heads is used, the system can improve each head in the system using the predictions of other heads. In some embodiments, the system adjusts trainable network parameters by computing the derivatives or partial derivatives of the joint loss function with respect to each trainable parameter. Specific details of back-propagation are not provided herein for the sake of brevity, and various back-propagation algorithms can be used.

Figure 4:
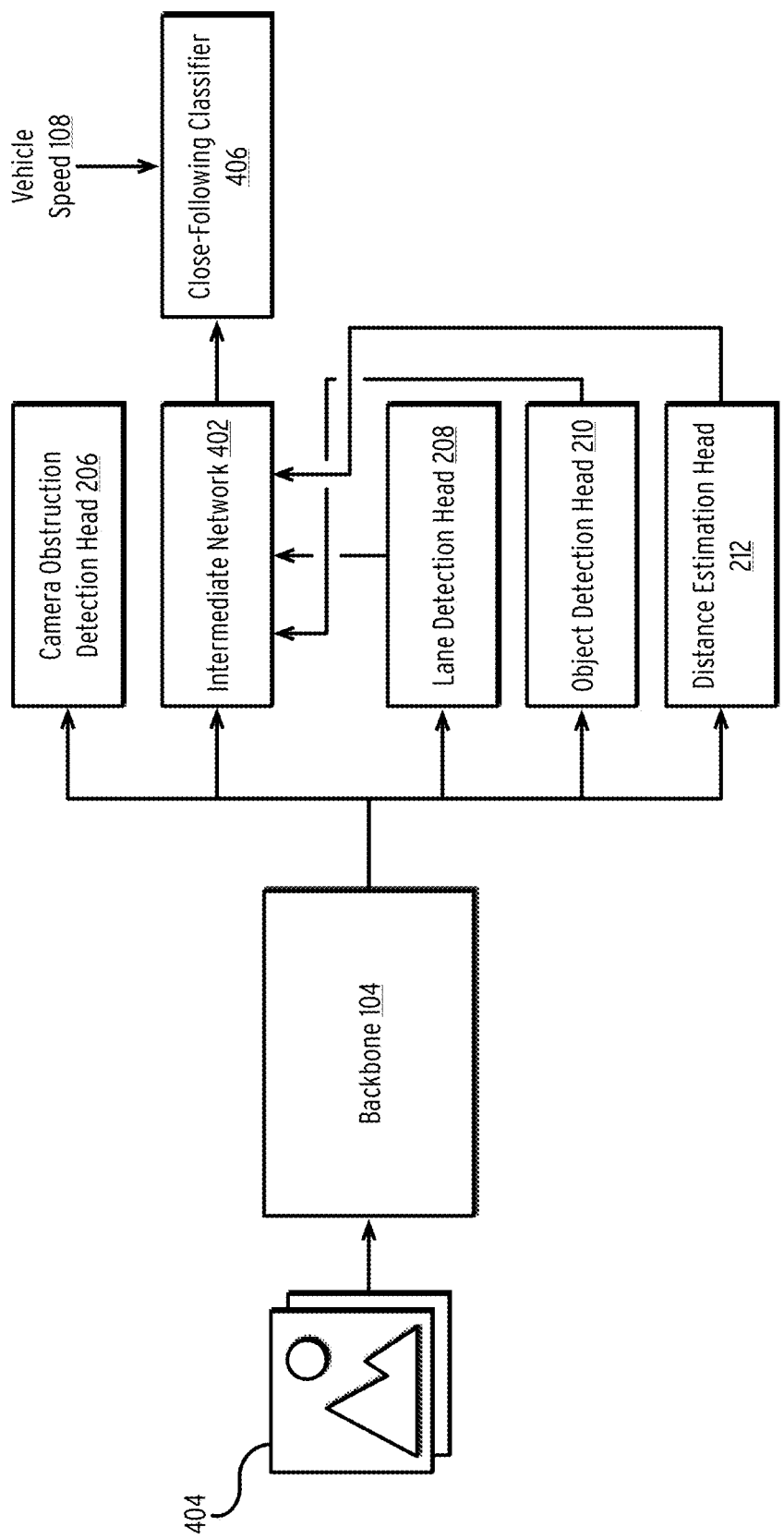
FIG. 4 is a block diagram illustrating a system for training an ML model for predicting close following according to some embodiments.

FIG. 4 is a block diagram illustrating a system for training an ML model for predicting close following according to some embodiments. In the embodiment depicted in FIG. 4, various elements bearing the same reference as those in FIGS. 2 and 3 are not repeatedly described herein, and the descriptions of those elements (e.g., backbone network 104, camera obstruction detection head 206, lane detection head 208, object detection head 210, distance estimation head 212, and vehicle speed 108) are incorporated herein in their entirety.

In the illustrated embodiment, an intermediate network 402 is placed before a close-following classifier 406. In one embodiment, the intermediate network 402 can comprise any network that uses a series of images (or other data) such as training images 404 to perform convolution operations and classification operations. Specifically, the intermediate network 402 has a temporal memory to classify training images 404 by considering the temporal history of image features over a fixed time window that includes the training images 404.

In an embodiment, the intermediate network 402 can comprise a plurality of convolutional layers followed by one or more long-short term memory (LSTM) layers. In some embodiments, a max-pooling layer can be inserted between the convolutional layers and the LSTM layers. In some embodiments, a fully connected layer can be placed after the LSTM layers to process the outputs of the LSTM layers. Alternatively, or in conjunction with the foregoing, the intermediate network 402 can comprise a recurrent neural network (RNN). In other embodiments, the intermediate network 402 can be implemented using Gated Recurrent Unit (GRU), bidirectional GRU, or transformer layers (versus LSTM or RNN layers).

As illustrated, the intermediate network 402 receives image features from backbone network 104 as well as the outputs of lane detection head 208, object detection head 210, and distance estimation head 212. The close-following classifier 406 then uses the output of the intermediate network 402 as its input.

The systems in FIGS. 2 and 3 operate on frame-level image features. By contrast, the use of the intermediate network 402 enables analysis on a history of information extracted over multiple frames captured over time. This history enables the system of FIG. 4 to extract long-term temporal dependencies between the information present in the temporal sequence of frames. Such an approach can assist in the scenarios where there were issues in detecting lane lines or vehicles or in distance estimation. As a result, in some scenarios, the system of FIG. 4 can improve the accuracy of close-following classifier 406. In some embodiments, the use of the intermediate network 402 obviates any need to post-process classification scores for event-level analysis, and the direct output of the close-following classifier 406 can be used to decide if there was a close-following event in the given video or not.

Figure 5:
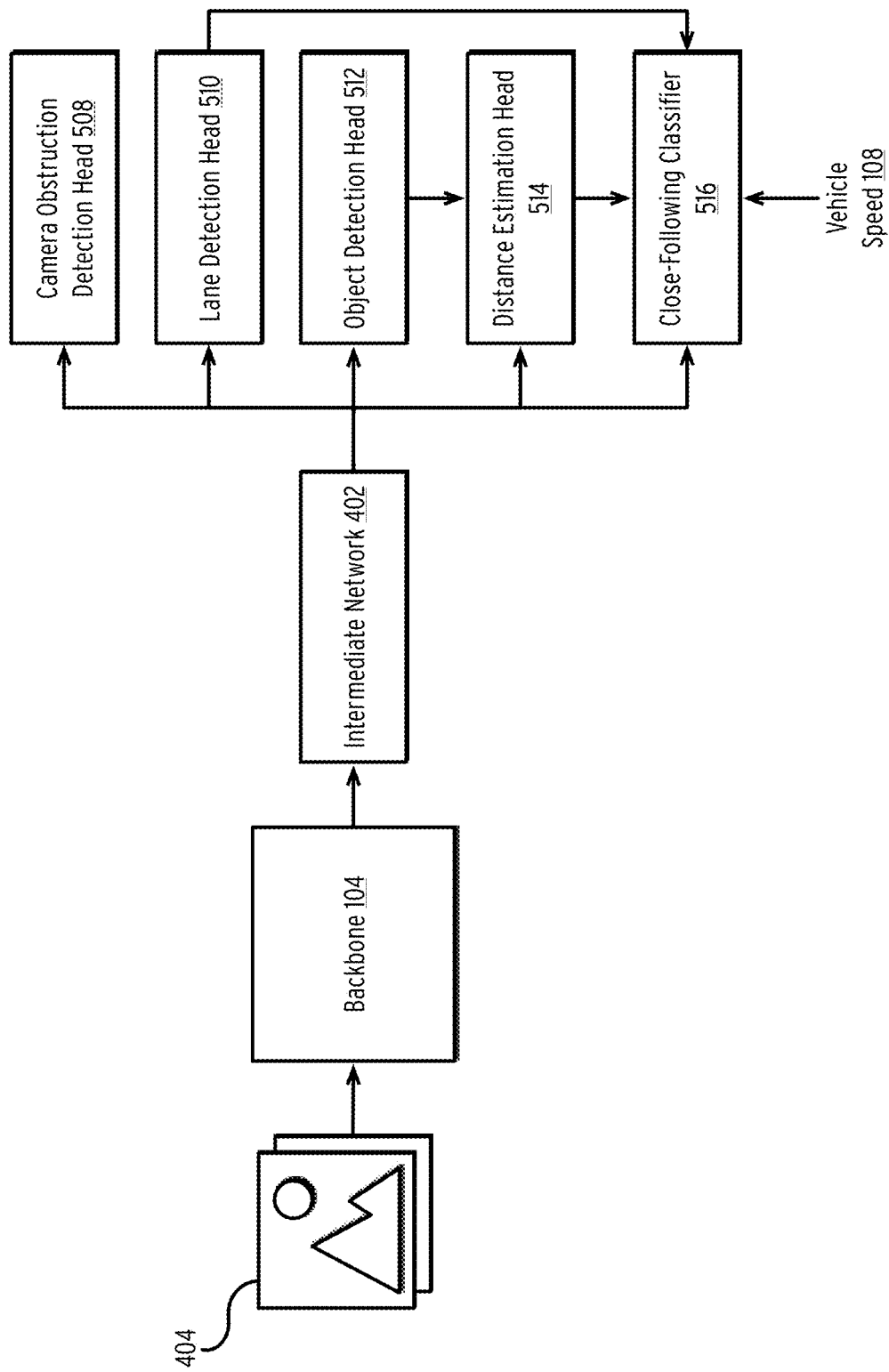
FIG. 5 is a block diagram illustrating a system for training an ML model for predicting close following according to some embodiments.

FIG. 5 is a block diagram illustrating a system for training an ML model for predicting close following according to some embodiments. In the embodiment depicted in FIG. 5, various elements bearing the same reference as those in FIGS. 2-4 are not repeatedly described herein, and the descriptions of those elements (e.g., training images 404, backbone network 104, intermediate network 402, and vehicle speed 108) are incorporated herein in their entirety.

In the illustrated embodiment, camera obstruction detection head 508, lane detection head 510, object detection head 512, distance estimation head 514, and close-following classifier 516 may operate similar to lane detection head 208, object detection head 210, distance estimation head 212, and close-following classifier 106 and the details of those corresponding prediction heads are not repeated herein. In contrast to the preceding figures, in FIG. 5, each prediction head receives, as input, the output of the intermediate network 402 versus the output of backbone network 104. In some embodiments, object detection head 512 and distance estimation head 514 may be replaced with a combined head such as that described in connection with combined head 302.

In some embodiments, both the embodiments of FIGS. 4 and 5 may be trained using a joint loss function similar to that described in FIGS. 2 and 3 and not repeated herein. That is, the individual loss functions of each prediction head can be aggregated into a joint loss function and back-propagated throughout the network. Notably, in FIGS. 4 and 5, instead of passing just one frame as input, the system provides a collection of consecutive frames. Thus, as described in FIGS. 4 and 5, training images 404 can comprise a batch of ordered images. During testing, the system can process an arbitrary number of consecutive frames and simultaneously obtain the predictions for all these frames.

FIG. 6A is a block diagram illustrating an ML model for predicting close following according to some embodiments. Various details of FIG. 6A have been described in the preceding figures, and reference is made to those figures for additional detail.

In the illustrated embodiment, a backbone network 604 receives an input image 602. Input image 602 can comprise an image of the roadway in front, captured by a dash-mounted or windshield-mounted camera from the vehicle equipped with the camera. In some embodiments, the backbone network 604 can comprise the backbone network 104, as described previously. For example, backbone network 604 can comprise an EfficientNet backbone network. In some embodiments, the backbone network 604 can comprise a reduced complexity version of backbone network 104. For example, in some embodiments, the backbone network 104 can comprise an EfficientNet backbone while backbone network 604 can comprise an EfficientNet-lite backbone.

A close-following classifier 606 is configured to receive a vehicle speed 610 and image features generated by the backbone network 604. In some embodiments, the close-following classifier 606 can comprise the close-following classifier 106 or close-following classifier 304, trained in the systems of FIGS. 2 and 3, respectively. Details of the operation of close-following classifier 606 are not repeated herein, and reference is made to the descriptions of close-following classifier 106 or close-following classifier 304. In the illustrated embodiment, the vehicle speed 610 may not be used for computing loss or adjusting network trainable parameters during training of this network. In the illustrated embodiment, the vehicle speed 610 can be obtained simultaneously with the image from, for example, vehicle telemetry systems. In some embodiments, the camera itself can be equipped to receive speed data from a vehicle via a standard port such as an onboard diagnostics port. In other embodiments, the device containing the camera may include its own sensor array to estimate speed and/or acceleration.

As illustrated, for each input image 602 and vehicle speed 610 corresponding to the input image 602, the close-following classifier 606 outputs a tag 608. In the illustrated embodiment, the tag 608 can comprise a binary classification of whether the input image 602 depicts a close-following event. In some embodiments, this tag 608 can be provided to downstream applications for further processing. For example, a downstream application can use a tag 608 having a positive value to sound an alarm, display a warning, or perform another action to alert the driver to a close-following event. Alternatively, or in conjunction with the foregoing, a downstream application can log the tag 608 value. Alternatively, or in conjunction with the foregoing, a downstream application can transmit the tag 608 value to a remote endpoint for review by a fleet manager or other entity. Alternatively, or in conjunction with the foregoing, a downstream application can use the value of the tag 608 to control the vehicle (e.g., applying a brake to increase the following distance).

FIG. 6B is a block diagram illustrating an ML model for predicting close following according to some embodiments. Various details of FIG. 6B have been described in the preceding figures, and reference is made to those figures for additional detail. Further, various elements bearing the same reference as those in FIG. 6A are not repeatedly described herein, and the descriptions of those elements (e.g., backbone network 604, close-following classifier 606, tag 608, vehicle speed 610) are incorporated herein in their entirety.

In the illustrated embodiment, the backbone network 604 receives a sequence of images 614, processes them one by one and feeds their features to intermediate network 612. In an embodiment, intermediate network 612 can comprise a network similar to or identical to intermediate network 402, the details of which are incorporated herein in their entirety. In brief, intermediate network 612 comprises a neural network that includes at least one memory layer to process sequences of images. The intermediate network 612 outputs image features to close-following classifier 606, and close-following classifier 606 generates a tag 608 based on the image features and the vehicle speed 610 associated with each image.

In contrast to FIG. 6A, the system of FIG. 6B utilizes an intermediate layer to exploit the temporal nature of close-following and thus uses a series of images 614 over a fixed time window. In some embodiments, vehicle speed is associated with each image and used when classifying a given frame using close-following classifier 606. Ultimately, the value of tag 608 can be passed to a downstream application as described in FIG. 6A.

In the illustrated embodiments of FIGS. 6A and 6B, although only a single close-following classifier 606 is illustrated, other embodiments may utilize multiple heads as depicted in FIGS. 2 through 5. In such an embodiment, the output of a close-following classifier 606 may still be used as the tag 608, while the outputs of the other heads can be used for other downstream applications. Examples of downstream applications include unsafe lane change detection, collision avoidance, among others. Further, as described above, the use of additional heads can be utilized to improve the performance of the close-following classifier 606.

Figure 7A:
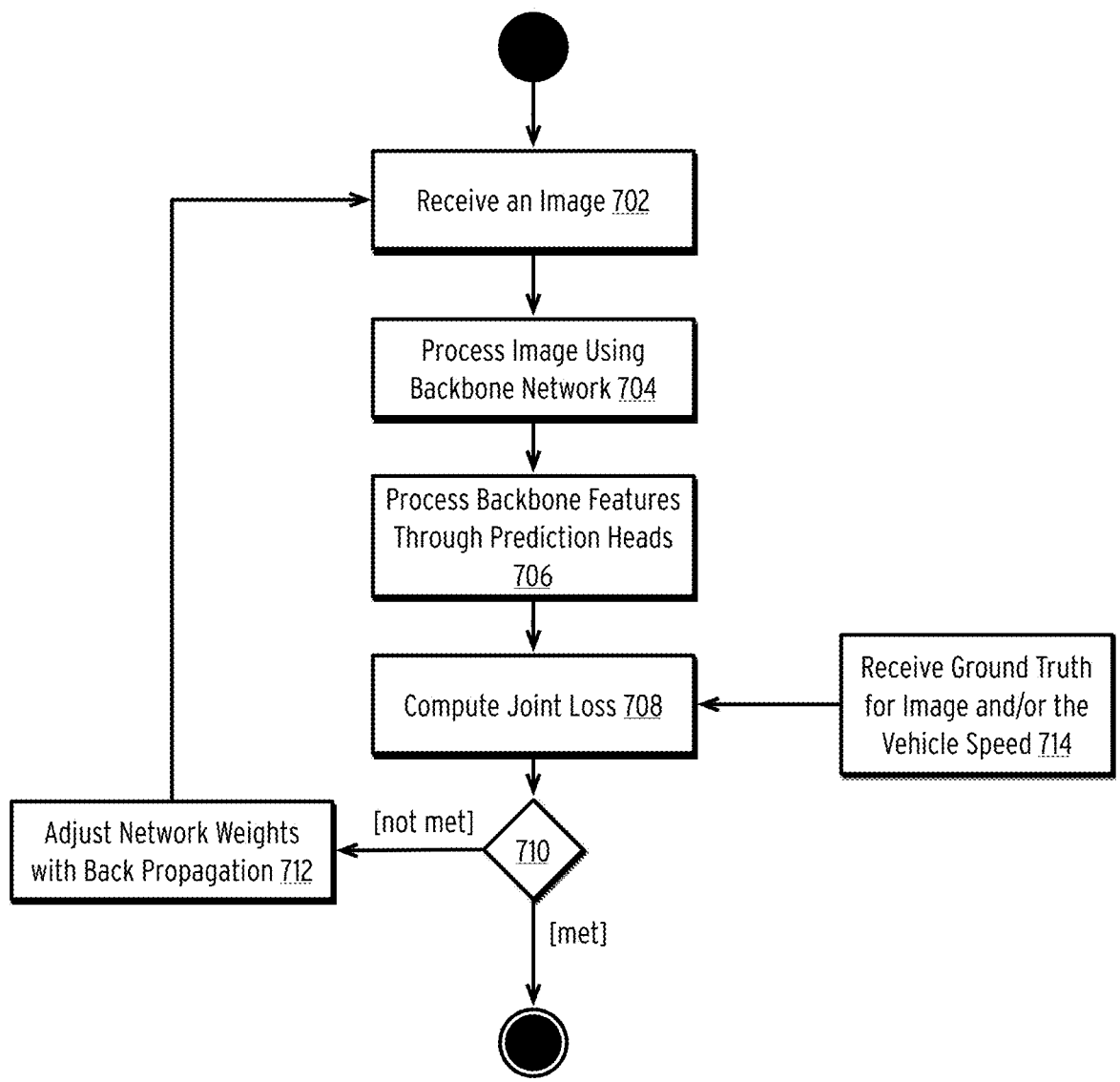
FIG. 7A is a flow diagram illustrating a method for training an ML model for predicting close following according to some embodiments.

FIG. 7A is a flow diagram illustrating a method for training an ML model for predicting close following according to some embodiments. Various details of FIG. 7A have been described in the preceding figures, and reference is made to those figures for additional detail.

In step 702, the method receives an image. In one embodiment, the image in the method comprises an image such as training image 102, the disclosure of which is incorporated in its entirety. In some embodiments, a set of images can be received as described in FIGS. 4 and 5.

In step 704, the method processes the image using a backbone network. In an embodiment, the backbone network can comprise a backbone network such as backbone network 104, the disclosure of which is incorporated in its entirety. In some embodiments, the backbone network can include an intermediate network (e.g., intermediate network 402).

In step 706, the method feeds backbone features into a plurality of prediction heads. In various embodiments, the prediction heads can include multiple prediction heads as depicted in FIGS. 2-5. In some embodiments, optional processing using an intermediate head (e.g., intermediate network 402) can be used prior to some or all heads. The specific processing of each of the prediction heads has been described previously in the descriptions of FIGS. 2-5 and is not repeated herein but is incorporated herein in its entirety.

In step 708, the method takes as input, from step 714, the ground truth image labels and (optionally) the vehicle speed corresponding to the processed image along with all the prediction heads' outputs to compute a single joint loss aggregating the individual losses of the plurality of prediction heads. Details of joint loss function and backpropagation are described in the previous FIGS. 2-5 and are not repeated herein but are incorporated in their entirety herein.

In step 710, the method determines if a stopping criterion is met. In one embodiment, the stopping criterion can comprise a configurable parameter set during the training of the ML model. In one embodiment, the stopping criterion can comprise a monitored performance metric such as the output of the loss function. Other types of stopping criteria can be utilized alone or in combination with the foregoing. For example, one stopping criterion may comprise the lack of a change in the loss function output across a configured number of epochs, a decrease in performance of the ML model, or a cap on maximum number of allowed epochs or iterations.

In step 712, if the method determines that the stopping criterion is not met, the method computes partial derivatives against all trainable network parameters and back-propagates them to adjust each layer parameters, as described previously.

In brief, in steps 702-712, the method can repeatedly adjust the parameters in the network so as to minimize a measure of the difference (e.g., cost function) between the predicted output of the ML model and the ground truth until the stopping criterion is met. Alternatively, when the method determines that a stopping criterion is met, the method may end. In the illustrated embodiment, if the method returns to step 702 after the decision step 710, the method will utilize the weights updated in step 712.

Figure 7B:
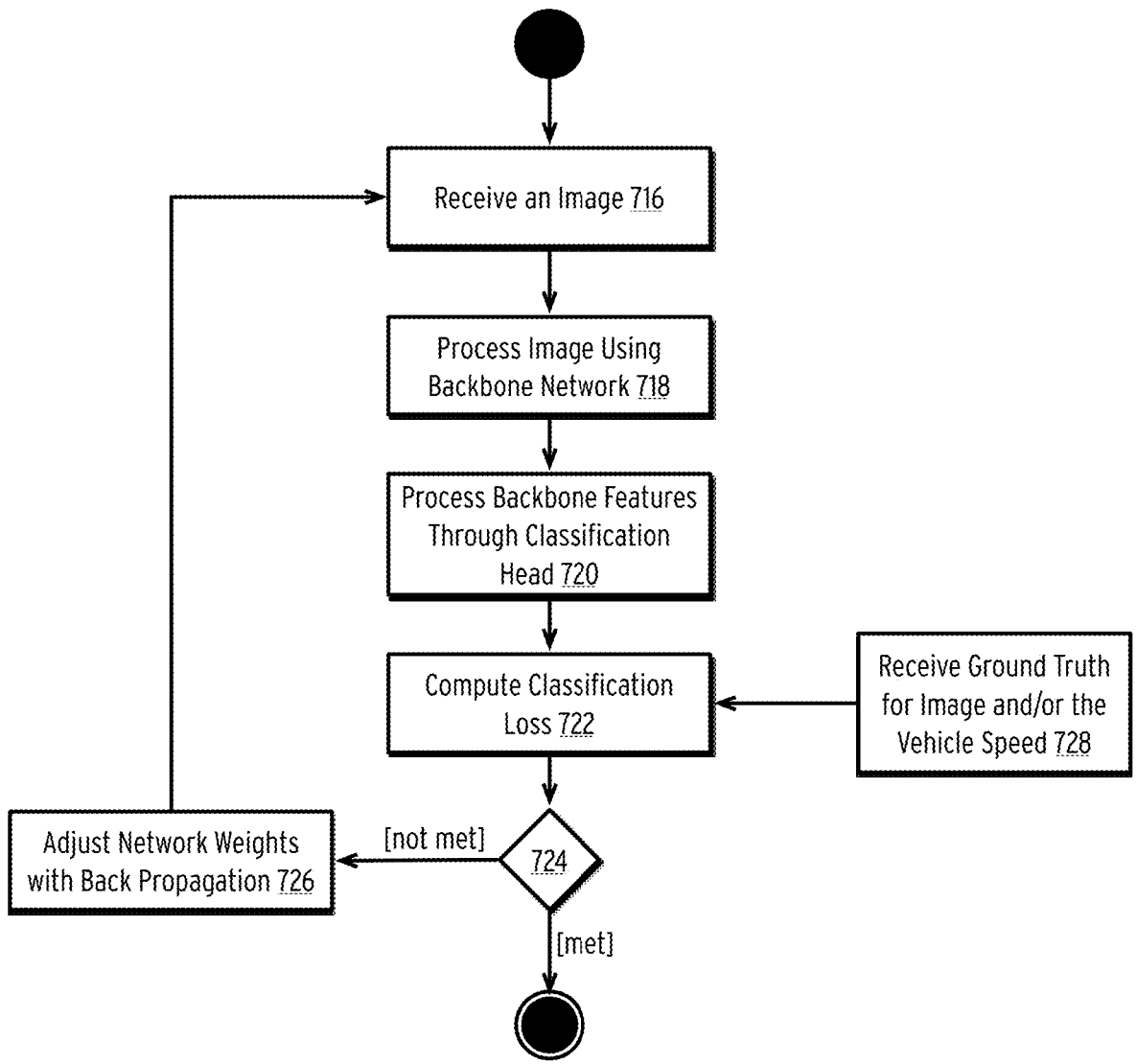
FIG. 7B is a flow diagram illustrating a method for training an ML model according to some embodiments.

FIG. 7B is a flow diagram illustrating a method for training an ML model according to some embodiments. Various details of FIG. 7B have been described in the preceding figures, such as FIG. 1, and reference is made to those figures for additional detail.

In step 716, the method receives an image or set of images. In one embodiment, the image(s) can comprise training image 102 or training images 404, the disclosure of which is incorporated in its entirety.

In step 718, the method processes the image(s) using a backbone network. In an embodiment, the backbone network can comprise a backbone network such as backbone network 104, the disclosure of which is incorporated in its entirety. In some embodiments, the backbone network can include an intermediate network (e.g., intermediate network 402).

In step 720, the method inputs the features of the backbone network (and, if implemented, an intermediate network) into a close-following classifier. In some embodiments, the close-following classifier can comprise close-following classifier 106, the disclosure of which is incorporated in its entirety.

In step 722, the method takes input, from 728, the ground truth image labels and (optionally) the vehicle speed corresponding to the processed image along with all the classification prediction head's output to compute a classification loss. Details of classification loss functions and backpropagation are described in the previous figures and are not repeated herein but are incorporated in their entirety herein.

In step 724, the method determines if a stopping criterion is met. If so, the method ends. In one embodiment, the stopping criterion can comprise a configurable parameter set during the training of the ML model. In one embodiment, the stopping criterion can comprise a monitored performance metric such as the output of the loss function. Other types of stopping criteria can be utilized alone or in combination with the foregoing. For example, one stopping criterion may comprise the lack of a change in the loss function output across a configured number of epochs, a decrease in performance of the ML model, or a cap on maximum number of allowed epochs or iterations.

In step 726, if the method determines that the stopping criterion is not met, the method will compute partial derivatives against all trainable network parameters and back-propagates them to adjust each layer parameters, as described previously.

In brief, in steps 716-726, the method can repeatedly adjust the parameters in the network so as to minimize a measure of the difference (e.g., cost function) between the predicted output of the ML model and the ground truth until the stopping criterion is met. In the illustrated embodiment, if the method returns to step 716 after step 726, the method will utilize the weights updated in step 726. Alternatively, when the method determines that a stopping criterion is met, the method may end.

Figure 7C:
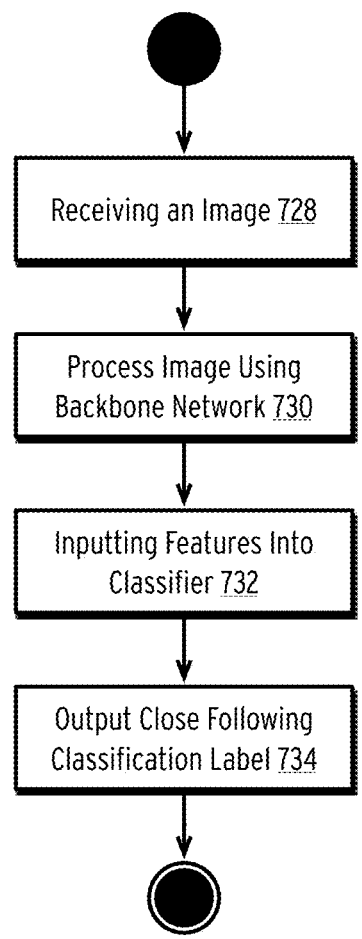
FIG. 7C is a flow diagram illustrating a method for predicting close following using an ML model according to some embodiments.

FIG. 7C is a flow diagram illustrating a method for predicting close following using an ML model according to some embodiments. Various details of FIG. 7C have been described in the preceding figures, and reference is made to those figures for additional detail.

In step 728, the method receives an image or set of images. In one embodiment, the image(s) can comprise input image 602 or images 614, the disclosure of which is incorporated in its entirety.

In step 730, the method processes the image(s) using a backbone network. In an embodiment, the backbone network can comprise a backbone network such as backbone network 604, the disclosure of which is incorporated in its entirety. In some embodiments, the backbone network can include an intermediate network (e.g., intermediate network 612).

In step 732, the method inputs the features of the backbone network (and, if implemented, an intermediate network) into a close-following classifier. In some embodiments, the close-following classifier can comprise close-following classifier 606, the disclosure of which is incorporated in its entirety.

In step 734, the method outputs a classification label. In some embodiments, the classification label can comprise a binary tag such as tag 608, the disclosure of which is incorporated in its entirety. In some embodiments, the classification label can be output to downstream applications for further processing or action.

Figure 8:
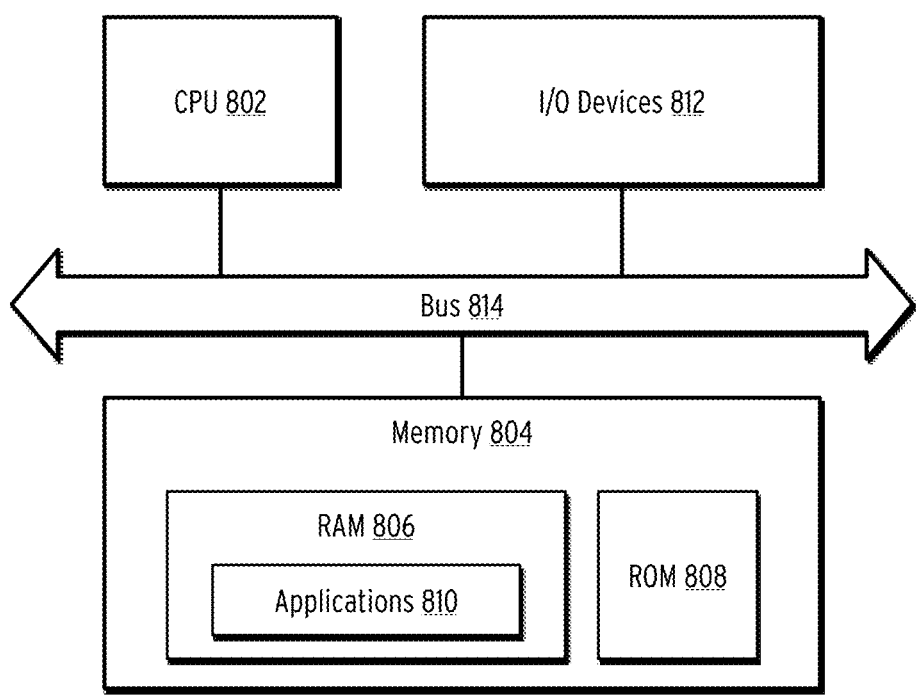
FIG. 8 is a block diagram of a computing device according to some embodiments of the disclosure.

FIG. 8 is a block diagram of a computing device according to some embodiments of the disclosure. In some embodiments, the computing device can be used to train and use the various ML models described previously.

As illustrated, the device includes a processor or central processing unit (CPU) such as CPU 802 in communication with a memory 804 via a bus 814. The device also includes one or more input/output (I/O) or peripheral devices 812. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 802 may comprise a general-purpose CPU. The CPU 802 may comprise a single-core or multiple-core CPU. The CPU 802 may comprise a system-on-a-chip (SoC) or a similar embedded system. In some embodiments, a graphics processing unit (GPU) may be used in place of, or in combination with, a CPU 802. Memory 804 may comprise a memory system including a dynamic random-access memory (DRAM), static random-access memory (SRAM), Flash (e.g., NAND Flash), or combinations thereof. In one embodiment, the bus 814 may comprise a Peripheral Component Interconnect Express (PCIe) bus. In some embodiments, the bus 814 may comprise multiple busses instead of a single bus.

Memory 804 illustrates an example of computer storage media for the storage of information such as computer-readable instructions, data structures, program modules, or other data. Memory 804 can store a basic input/output system (BIOS) in read-only memory (ROM), such as ROM 808 for controlling the low-level operation of the device. The memory can also store an operating system in random-access memory (RAM) for controlling the operation of the device Applications 810 may include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 806 by CPU 802. CPU 802 may then read the software or data from RAM 806, process them, and store them in RAM 806 again.

The device may optionally communicate with a base station (not shown) or directly with another computing device. One or more network interfaces in peripheral devices 812 are sometimes referred to as a transceiver, transceiving device, or network interface card (NIC).

An audio interface in peripheral devices 812 produces and receives audio signals such as the sound of a human voice. For example, an audio interface may be coupled to a speaker and microphone (not shown) to enable telecommunication with others or generate an audio acknowledgment for some action. Displays in peripheral devices 812 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 812 may comprise any input device arranged to receive input from a user. An illuminator in peripheral devices 812 may provide a status indication or provide light. The device can also comprise an input/output interface in peripheral devices 812 for communication with external devices, using communication technologies, such as USB, infrared, Bluetooth™, or the like. A haptic interface in peripheral devices 812 provides tactile feedback to a user of the client device.

A GPS receiver in peripheral devices 812 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 8, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein. Example embodiments are provided merely to be illustrative. Likewise, the reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order. For example, two blocks shown in succession can, in fact, be executed substantially concurrently, or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, cloud storage, magnetic cassettes, magnetic tape, magnetic disk storage, or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

We claim:

1. A system comprising:
a backbone network configured to receive an image as an input, the backbone network comprising a machine learning model; and
at least one prediction head communicatively coupled to the backbone network, the at least one prediction head configured to
receive a vector output from the backbone network,
generate a combined input vector that concatenates the vector output from the backbone network and a vehicle speed recorded at a time associated with the image,
input the combined input vector into a classifier, and
obtain a classification of the image as representing a close-following event based on processing of the combined input vector by the classifier.

2. The system of claim 1, wherein the at least one prediction head includes a plurality of prediction heads and the plurality of prediction heads is trained using a joint loss function aggregating losses of each of the plurality of prediction heads.

3. The system of claim 2, wherein the plurality of prediction heads comprises a camera obstruction detection head, a lane detection head, an object detection head, and a distance estimation head.

4. The system of claim 3, wherein the classifier is configured to receive inputs from the lane detection head and the distance estimation head.

5. The system of claim 4, wherein the distance estimation head is configured to receive an input from the object detection head.

6. The system of claim 3, wherein the plurality of prediction heads further comprises an intermediate neural network, the intermediate neural network configured to process the output of the backbone network and transmit the output to the classifier.

7. The system of claim 3, further comprising an intermediate neural network configured to process the output of the backbone network and transmit the output to each of the plurality of prediction heads.

8. The system of claim 2, wherein the plurality of prediction heads comprises a camera obstruction detection head, a lane detection head, and an object bounding box, lane number and distance estimation head.

9. The system of claim 8, wherein the classifier is configured to receive inputs from the lane detection head and the object bounding box, lane number and distance estimation head.

10. The system of claim 8, wherein the object bounding box, lane number and distance estimation head is configured to receive an input from the lane detection head.

11. A system comprising:
a backbone network configured to receive an image as an input, the backbone network comprising a machine learning model; and
a classifier configured to output a classification of the image as including a close-following event or not, the classifier receiving, as input, a combined input vector that comprises a concatenation of a vector output from the backbone network and a vehicle speed recorded at a time associated with the image, the classifier trained using a neural network, the neural network comprising at least one prediction head including the classifier, the at least one prediction head communicatively coupled to the backbone network based on processing of the combined input vector by the classifier.

12. The system of claim 11, further comprising an intermediate neural network communicatively coupled to the backbone network and the classifier, the intermediate neural network configured to process the output of the backbone network prior to transmitting the output to the classifier.

13. The system of claim 11, wherein the backbone network is configured to receive a video frame from a camera.

14. The system of claim 13, wherein the camera comprises a camera situated in a dash-mounted or windshield-mounted device.

15. The system of claim 14, wherein the backbone network and the classifier are executed on the dash-mounted or windshield-mounted device.

16. A non-transitory computer-readable storage medium for tangibly storing computer program instructions capable of being executed by a computer processor, the computer program instructions comprising steps of:
receiving an image;
processing the image using a backbone network as an input, the backbone network comprising a machine learning model, an output of the backbone network comprising a set of features;

generating combined input vectors that each concatenate the set of features from the backbone network and a respective set of vehicle speeds recorded at a time associated with the set of features, wherein the at least one prediction head generates a prediction vector, and wherein the at least one prediction head includes a classifier configured to classify the image as including a close-following event based on processing of the combined input vectors; and adjusting parameters of the backbone network and the at least one prediction head using a loss function.

17. The non-transitory computer-readable storage medium of claim 16, wherein the at least one prediction head further comprises an intermediate neural network, the intermediate neural network configured to process the output of the backbone network and transmit the output to the classifier.

18. The non-transitory computer-readable storage medium of claim 16, further comprising processing, using an intermediate neural network, the output of the backbone network, and transmitting the output to the at least one prediction head.

19. The non-transitory computer-readable storage medium of claim 16, wherein the at least one prediction head comprises a plurality of prediction heads including a camera obstruction detection head, a lane detection head, and an object bounding box, lane number and distance estimation head.

20. The non-transitory computer-readable storage medium of claim 19, wherein the loss function comprises a joint loss function aggregating individual loss functions of the plurality of prediction heads, each of the individual loss functions associated with a corresponding prediction head in the plurality of prediction heads.

* * * * *